(12) United States Patent
Jeong et al.

(10) Patent No.: US 12,158,593 B2
(45) Date of Patent: Dec. 3, 2024

(54) THREE-DIMENSIONAL AUGMENTED REALITY HEAD-UP DISPLAY FOR IMPLEMENTING AUGMENTED REALITY IN DRIVER'S POINT OF VIEW BY PLACING IMAGE ON GROUND

(71) Applicant: NAVER LABS CORPORATION, Seongnam-si (KR)

(72) Inventors: Eunyoung Jeong, Seongnam-si (KR); Jae Won Cha, Seongnam-si (KR)

(73) Assignee: NAVER CORPORATION, Seongnam-si (KR)

( * ) Notice: Subject to any disclaimer, the term of this patent is extended or adjusted under 35 U.S.C. 154(b) by 937 days.

(21) Appl. No.: 17/199,820

(22) Filed: Mar. 12, 2021

(65) Prior Publication Data

US 2021/0197669 A1 Jul. 1, 2021

Related U.S. Application Data

(63) Continuation of application No. PCT/KR2018/015307, filed on Dec. 5, 2018.

(30) Foreign Application Priority Data

Oct. 10, 2018 (KR) .................. 10-2018-0120463
Oct. 10, 2018 (KR) .................. 10-2018-0120504
Nov. 28, 2018 (KR) .................. 10-2018-0149251

(51) Int. Cl.
*G02B 27/01* (2006.01)
*B60K 35/23* (2024.01)
(Continued)

(52) U.S. Cl.
CPC .......... *G02B 27/0179* (2013.01); *B60K 35/23* (2024.01); *B60K 35/232* (2024.01);
(Continued)

(58) Field of Classification Search
CPC ............ G02B 27/0179; G02B 27/0101; B60K 35/23; B60K 35/232; B60K 35/233; B60K 35/234; B60K 35/235
See application file for complete search history.

(56) References Cited

U.S. PATENT DOCUMENTS

2010/0073773 A1* 3/2010 Hotta ................ G02B 27/01 359/630
2010/0164702 A1* 7/2010 Sasaki ............... G02B 27/01 345/7
(Continued)

FOREIGN PATENT DOCUMENTS

CN 107710751 A 2/2018
DE 112015006458 B4 5/2019
(Continued)

OTHER PUBLICATIONS

Office Action issued in corresponding Chinese patent application No. 201880096389.0, dated Mar. 16, 2022.
(Continued)

*Primary Examiner* — Bao-Luan Q Le
(74) *Attorney, Agent, or Firm* — Greer Burns & Crain Ltd.

(57) ABSTRACT

A vehicular three-dimensional head-up display includes a display device functioning as a light source; and a combiner for simultaneously reflecting light from the light source toward a driver's seat and transmitting light from the outside of a vehicle, and may include an optical configuration in which an image created by the light from the light source is displayed as a virtual image of a three-dimensional perspective laid to correspond to the ground in front of the vehicle.

17 Claims, 17 Drawing Sheets

(51) Int. Cl.
  *B60K 35/232* (2024.01)
  *B60K 35/233* (2024.01)
  *B60K 35/234* (2024.01)
  *B60K 35/235* (2024.01)
  *B60K 35/00* (2006.01)
  *B60K 35/21* (2024.01)
  *B60K 35/28* (2024.01)
  *B60K 35/29* (2024.01)
  *G02B 26/08* (2006.01)

(52) U.S. Cl.
  CPC .......... *B60K 35/233* (2024.01); *B60K 35/234* (2024.01); *B60K 35/235* (2024.01); *G02B 27/0101* (2013.01); *B60K 35/00* (2013.01); *B60K 35/211* (2024.01); *B60K 35/28* (2024.01); *B60K 35/29* (2024.01); *B60K 2360/179* (2024.01); *B60K 2360/182* (2024.01); *B60K 2360/23* (2024.01); *B60K 2360/31* (2024.01); *G02B 26/0816* (2013.01); *G02B 2027/0187* (2013.01)

(56) References Cited

U.S. PATENT DOCUMENTS

| | | | |
|---|---|---|---|
| 2012/0170130 A1* | 7/2012 | Sasaki | B60K 35/00 359/630 |
| 2018/0129051 A1 | 5/2018 | Hung | |
| 2019/0005726 A1* | 1/2019 | Nakano | G06T 19/006 |
| 2019/0025580 A1* | 1/2019 | Nagano | G02B 27/01 |
| 2019/0139286 A1* | 5/2019 | Shimoda | G01C 21/36 |
| 2019/0244587 A1* | 8/2019 | Hada | B60K 35/00 |
| 2019/0258057 A1* | 8/2019 | Hada | G02B 27/0101 |
| 2019/0294895 A1* | 9/2019 | Kleen | G02B 27/0101 |
| 2019/0391392 A1* | 12/2019 | Ogata | B60K 35/28 |
| 2020/0064640 A1* | 2/2020 | Nagano | G09G 3/001 |
| 2020/0152157 A1* | 5/2020 | Hada | G09G 5/38 |
| 2021/0271079 A1* | 9/2021 | Yoneda | G01C 21/36 |

FOREIGN PATENT DOCUMENTS

| | | |
|---|---|---|
| JP | 10278629 A | 10/1998 |
| JP | 2006145998 A | 6/2006 |
| JP | 2014181025 A | 9/2014 |
| JP | 6269262 B2 | 11/2015 |
| JP | 2016068693 A | 5/2016 |
| JP | 2016102966 A | 6/2016 |
| JP | 2018077400 A | 5/2018 |
| KR | 1020130059650 A | 6/2013 |
| KR | 101409846 B1 | 6/2014 |
| KR | 1020150056234 A | 5/2015 |
| KR | 1020160059376 A | 5/2016 |
| KR | 1020170083798 A | 7/2017 |
| KR | 1020170120958 A | 11/2017 |
| KR | 1020180030307 A | 3/2018 |
| WO | 2014061138 A1 | 4/2014 |
| WO | 2016166887 A1 | 10/2016 |
| WO | 2017094427 A1 | 6/2017 |
| WO | 2018043558 A1 | 3/2018 |
| WO | 2018088360 A1 | 5/2018 |
| WO | 2018168595 A1 | 9/2018 |

OTHER PUBLICATIONS

Office Action issued in Korean patent application No. 10-2021-0003943, dated Feb. 10, 2021.
Search Report issued in Int'l. patent application No. PCT/KR2018/015307, dated Jul. 9, 2019.
Office Action issued in corresponding Chinese patent application No. 201980052703.X, dated Oct. 10, 2022.
EP Search Report issued in corresponding European patent application No. 18936430.0, dated Jun. 28, 2022.
Office Action issued in corresponding Japanese patent application No. 2021-510058, dated Mar. 1, 2022.

* cited by examiner

THREE-DIMENSIONAL AUGMENTED REALITY HEAD-UP DISPLAY FOR IMPLEMENTING AUGMENTED REALITY IN DRIVER'S POINT OF VIEW BY PLACING IMAGE ON GROUND

CROSS-REFERENCE TO RELATED APPLICATIONS

This is a continuation application of International Application No. PCT/KR2018/015307, filed Dec. 5, 2018, which claims the benefit of Korean Patent Application Nos. 10-2018-0120504, filed Oct. 10, 2018, 10-2018-0120463, filed Oct. 10, 2018, and 10-2018-0149251, filed Nov. 28, 2018.

BACKGROUND OF THE INVENTION

Field of Invention

One or more example embodiments of the following description relate to a three-dimensional (3D) head-up display.

Description of Related Art

FIG. 1 illustrates a view for describing a focus adjustment to verify information of a conventional head-up display device.

Referring to FIG. 1, a conventional vehicular head-up display (HUD) device refers to a vehicular display device that minimizes unnecessary distraction of a driver by transmitting an image, such as, for example, the current speed, the fuel level, and navigation route guide information, from a display 10 by projecting a graphic image on a windshield 13 in front of the driver through optical systems 11 and 12. Here, the optical systems 11 and 12 may include a plurality of mirrors configured to change the optical path of the image transmitted from the display 10.

The above vehicular head-up display device may induce an immediate response from the driver and may provide convenience at the same time.

In the conventional vehicular head-up display (HUD) device, an image is fixedly present at about 2 to 3 meters (m) in front of a user. In contrast, when driving, a gaze distance of a driver is close to a distance of about 300 m. Therefore, the driver drives the vehicle while gazing at a far distance and, to verify information of the head-up display (HUD) device, there is an inconvenience to largely adjust the focus of eyes. That is, the focus of the driver may be repeatedly adjusted between a far distance at which the main field of view (FOV) is present and ~3 m in which the image is formed.

Accordingly, there is a need for development of a three-dimensional (3D) head-up display device that may implement augmented reality in a driving environment and may be free from restrictions on an image expression distance such that the driver may acquire desired information without changing the focus of eyes at the point of view, that is, the perspective at which the driver is gazing while driving.

For example, Korean Patent Registration No. 10-1409846 relates to a 3D augmented reality (AR)-based head-up display device and describes technology about a head-up display device that may provide more realistic information to a driver by three-dimensionally displaying image information augmented as a 3D image based on actual distance information.

BRIEF SUMMARY OF THE INVENTION

One or more example embodiments provide a three-dimensional (3D) head-up display having a 3D implementation scheme of providing a location of an image to correspond to the ground.

One or more example embodiments provide a 3D head-up display that may represent a virtual screen as a 3D perspective laid to correspond to the ground.

One or more example embodiments provide a method that may minimize an error occurring according to a surrounding environment in a 3D head-up display configured to implement augmented reality at the point of view of a driver by locating an image on the ground.

One or more example embodiments provide a method that may effectively correct an error occurring due to a difference between the sense of distance of an image provided by a 3D head-up display and a surrounding environment, based on an error occurrence pattern.

According to an aspect of at least one example embodiment, there is provided a vehicular three-dimensional (3D) head-up display including a display device configured to function as a light source; and a combiner configured to simultaneously reflect light from the light source toward a driver's seat and to transmit light from outside of a vehicle. An image created by the light from the light source is displayed as a virtual image of a 3D perspective laid to correspond to the ground in front of the vehicle.

According to one aspect, a display plane corresponding to the display device may be configured to meet an imaging condition with a virtual image plane corresponding to the ground through the combiner.

According to another aspect, the virtual image may be created based on an imaging condition between a display plane corresponding to the display device and a combiner plane corresponding to the combiner and a virtual image plane corresponding to the ground.

According to still another aspect, a start location and a size of the virtual image may be determined using an angle that meets the imaging condition on the display plane and the virtual image plane based on a straight line that is perpendicular to the combiner plane and passes an optical center of the combiner.

According to still another aspect, the start location and the size of the virtual image may be adjusted based on at least one of an angle of the display plane based on the virtual image plane, an angle between the display plane and the combiner plane, and a height from the virtual image plane to the optical center of the combiner.

According to still another aspect, a separation distance between the display device and the combiner at a height from the virtual image plane to the combiner may be derived based on a height value acquired by adding an offset toward a corresponding height direction to a height from the virtual image plane to an optical center of the combiner, an angle of the display plane based on the virtual image plane, an angle of the combiner plane based on the virtual image plane, and an angle between the display plane and the combiner plane.

According to still another aspect, a location of the combiner may be determined based on a height that includes an offset according to a location of a required eye-box.

According to still another aspect, the vehicular 3D head-up display may further include a processor configured to display the virtual image as a perspective image.

According to still another aspect, the display device may be configured in a form in which multiple light sources are arranged to simultaneously implement multiple images.

According to still another aspect, the display device may include a first display configured to create an image laid to correspond to the ground; and at least one second display configured to create an image perpendicular to the ground.

According to still another aspect, the vehicular 3D head-up display may further include a processor configured to recognize and correct a distance error between a background corresponding to the ground and the virtual image based on surrounding information on an area in front of the vehicle.

According to still another aspect, the processor may be configured to distinguishably recognize an overall error that the distance error occurs in an overall area in front, a partial error that the distance error occurs in a partial area in front, and a complete error of a situation in which a distance from an object in front is close within a threshold, based on the surrounding information.

According to still another aspect, the processor may be configured to acquire the surrounding information from a sensor included in the vehicular 3D head-up display or an advanced driver-assistance system (ADAS) or a sensor included in the vehicle.

According to still another aspect, the processor may be configured to adjust the virtual image to maintain the distance error within a preset error tolerance range.

According to still another aspect, the processor may be configured to perform a correction of adjusting the perspective of the virtual image.

According to still another aspect, the processor may be configured to adjust an inclination or a location of the virtual image by adjusting at least one of the light source and the combiner.

According to still another aspect, the processor may be configured to move a location of the combiner if the location of the virtual image is outside a field of view (FOV) of the combiner.

According to still another aspect, the processor may be configured to adjust perspective of a portion in which an error occurs or to remove a partial image thereof if the distance error occurs in a partial area in front.

According to still another aspect, if the distance error occurs due to an obstacle in front, the processor may be configured to display an image that is perpendicular to the ground on the obstacle or at a closer distance than the obstacle instead of displaying the ground.

According to still another aspect, the display device may include a first display configured to create an image laid to correspond to the ground; and at least one second display configured to create an image perpendicular to the ground and, if the distance error occurs due to an obstacle in front, the processor may be configured to display the virtual image using the second display instead of using the first display.

According to an aspect of at least one example embodiment, there is provided a method of correcting an error of a vehicular 3D head-up display configured to display an image created by light from a light source as a virtual image of a 3D perspective laid to correspond to the ground in front of a vehicle through a combiner, the error correction method including, by at least one processor, recognizing a distance error between a background corresponding to the ground and the virtual image based on surrounding information on an area in front of the vehicle; and correcting the distance error by adjusting the virtual image.

According to an aspect of at least one example embodiment, there is provided a computer-program stored in a non-transitory computer-readable recording medium to implement the error correction method on the computer system.

According to an aspect of at least one example embodiment, there is provided an apparatus for correcting an error of a vehicular 3D head-up display, the error correction apparatus including at least one processor configured to execute computer-readable instructions included in a memory and the vehicular 3D head-up display configured to display an image created by light from a light source as a virtual image of a 3D perspective laid to correspond to the ground in front of a vehicle through a combiner. The at least one processor includes an error recognizer configured to recognize a distance error between a background corresponding to the ground and the virtual image based on surrounding information on an area in front of the vehicle; and an error corrector configured to correct the distance error by adjusting the virtual image.

According to some example embodiments, it is possible to provide a three-dimensional (3D) head-up display having a 3D implementation scheme of providing a location of an image to correspond to the ground.

According to some example embodiments, it is possible to provide a 3D head-up display that may represent a virtual screen as a 3D perspective laid to correspond to the ground.

According to some example embodiments, it is possible to provide a 3D head-up display optimized for the point of view of a driver through a virtual screen of a 3D perspective corresponding to the ground.

According to some example embodiments, it is possible to minimize an error occurring according to a surrounding environment in a 3D head-up display configured to implement augmented reality at the point of view of a driver by locating an image on the ground.

According to some example embodiments, it is possible to effectively correct an error occurring due to a difference between the sense of distance of an image provided by a 3D head-up display and a surrounding environment, based on an error occurrence pattern.

DETAILED DESCRIPTION OF THE INVENTION

Hereinafter, example embodiments will be described with reference to the accompanying drawings.

The following example embodiments may be modified in various forms and the scope of the disclosure is not limited to the following example embodiments. Also, the various example embodiments are provided to fully explain the disclosure to those skilled in the art. Shapes and sizes of elements illustrated in the figures may be simplified or may be reduced or exaggerated for simplicity of description.

Figure 1:
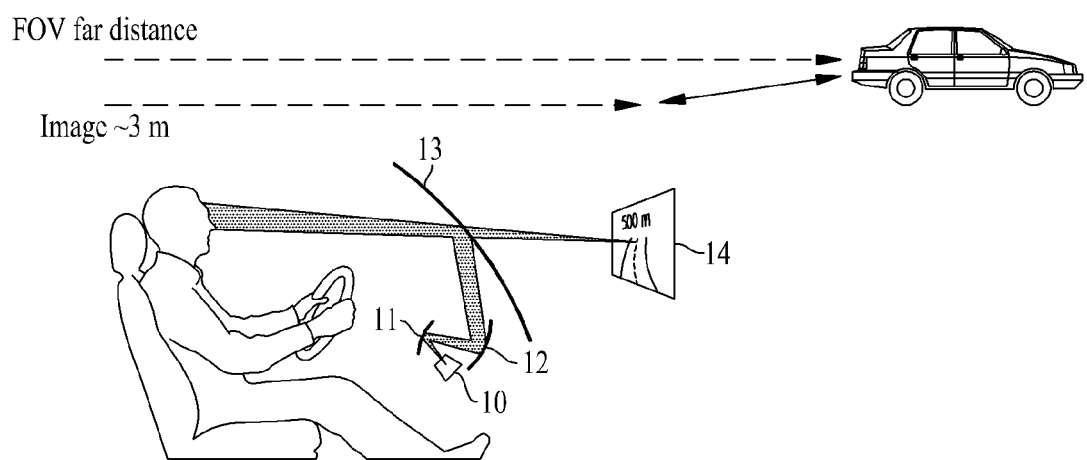
FIG. 1 illustrates a diagram for describing a focus adjustment to verify information of a conventional head-up display device.

In addition to the existing head-up display described with respect to FIG. 1, many displays, such as a television (TV), a monitor, a projector screen, and a virtual reality (VR)/augmented reality (AR) glass, are provided in a direction perpendicular to the gaze of a user.

The example embodiments provide a three-dimensional (3D) head-up display having a 3D implementation scheme for locating an image to correspond to the ground, i.e., on the ground. In particular, the example embodiments may provide a 3D head-up display optimized for the point of view of a driver in a driving environment by representing a virtual screen as a 3D perspective laid to correspond to the ground, i.e., parallel to the ground.

Figure 2:
FIG. 2 is a diagram illustrating a location of an image of a three-dimensional (3D) head-up display according to an example embodiment.

FIG. 2 illustrates an example of a location of an image of a 3D head-up display according to an example embodiment.

Referring to FIG. 2, the 3D head-up display according to an example embodiment may represent the location of an imaginary image, that is, a virtual image 24 viewed with the eyes of a user as a 3D perspective laid to correspond to the road in front of a driver.

An image through an optical system of a known vehicular head-up display is located at a fixed distance of 2 to 3 meters (m) in front of the driver and is generally perpendicular to the ground 25. Dissimilarly, the 3D head-up display method according to an example embodiment is to locate the virtual image 24 on a virtual plane corresponding, i.e., parallel, to the ground 25 in front of the driver.

The 3D head-up display according to an example embodiment employs a scheme of creating the virtual image 24 visible with the eyes by reflecting through an optical system of the head-up display, and not a scheme of creating an actual image by directly projecting onto a screen, such as a conventional projector.

Main information provided from a vehicular navigation corresponds to information on a turn on a road being driven, lane information, and information on the distance from a vehicle in front. Also, an advanced driver-assistance system (ADAS) provides safety related information to the driver. Here, the information generally includes lane information, information on the distance from a vehicle in front/next, and unexpected information. Likewise, a vehicle that is an entity to be driven may need to provide the passenger with information on a situation that may happen in the future, such as, for example, a turn or a lane change on a road during autonomous driving.

Figure 3:
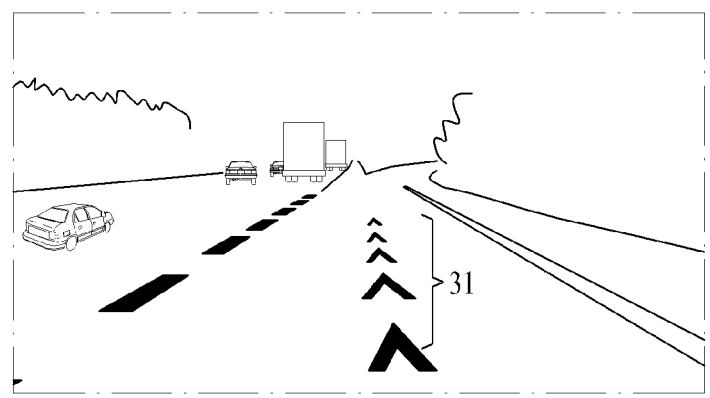
FIG. 3 illustrates diagrams showing an image provided on a virtual plane corresponding to the ground, such as a road surface, according to an example embodiment.
Figure 3:
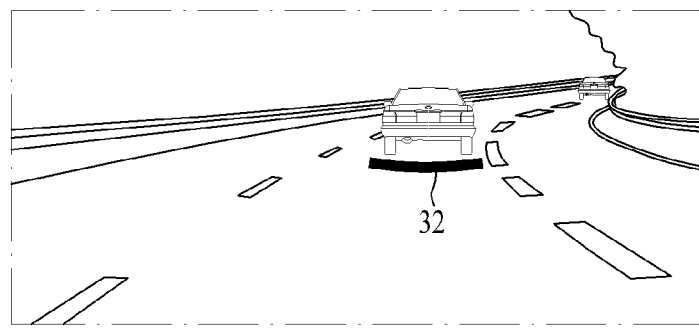

Referring to FIG. 3, it is important and effective to display the aforementioned information, for example, lane information 31 and information 32 on the distance from a vehicle in front, as a virtual image on an actual road surface at the point of view of the driver.

The 3D head-up display according to an example embodiment may represent a virtual screen as a 3D perspective laid to correspond to the ground and thereby implement information desired to transfer to the user as augmented reality on the road surface actually gazed by the user while driving without a need to shift the focus of eyes from the point of view of the user while driving to another location in various driving environments.

Figure 4:
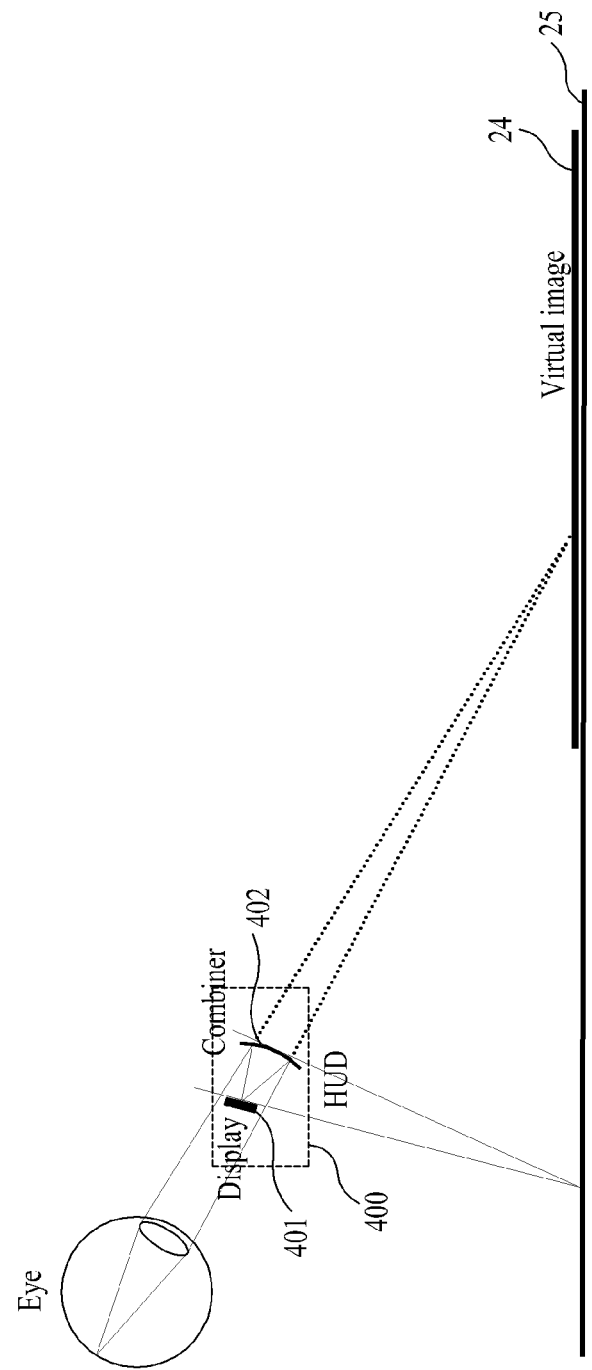
FIG. 4 is a diagram of an optical design configuration of a 3D head-up display according to an example embodiment.

FIG. 4 illustrates an example of an optical design of a 3D head-up display according to an example embodiment.

Referring to FIG. 4, a 3D head-up display (HUD) 400 according to an example embodiment includes an optical design structure for representing the virtual image 24 as a 3D perspective laid to correspond to the ground 25 and may include a display device 401 corresponding to a display source and a combiner 402.

That is, the 3D head-up display 400 may include the display device 401 configured to function as a light source and the combiner 402 configured to simultaneously reflect light from the light source toward the eye of a user and to transmit light from outside, for example, the front of the vehicle.

The combiner 402 may include a single optical element or a plurality of optical elements. In the following, it is assumed for clarity of description that the combiner 402 including a single optical element is used.

To increase the quality of an image or to achieve an optimal size or performance depending on the case, an additional optical system may be further included between the display device 401 and the combiner 402.

Also, the combiner 402 may be configured as an element included in the 3D head-up display 400 or may use a vehicular windshield as the combiner 402. To use the vehicular windshield as the combiner 402, additional optical measures required to simultaneously reflect light from the display device 401 toward the driver's seat and to transmit light from outside. At a time of manufacturing the vehicle, the function of the combiner 402 may be included as a basic function of the windshield. In this case, the additional optical measures are not necessarily required.

In the following, a theoretical relational equation between the display device 401 and the combiner 402 that may locate the virtual image 24 by the 3D head-up display 400 to correspond to the ground 25 is derived.

In a configuration of the 3D head-up display 400, the display device 401 and the combiner 402 are close to being perpendicular relative to the ground 25 and the eye of the user sitting on the driver's seat in the vehicle look forward generally in the horizontal direction. FIG. 4 illustrates a limited situation for clarity of description. The virtual image 24 generated by the 3D head-up display 400 may be actually located at a farther distance and some differences may be present compared to an actual situation.

Figure 5:
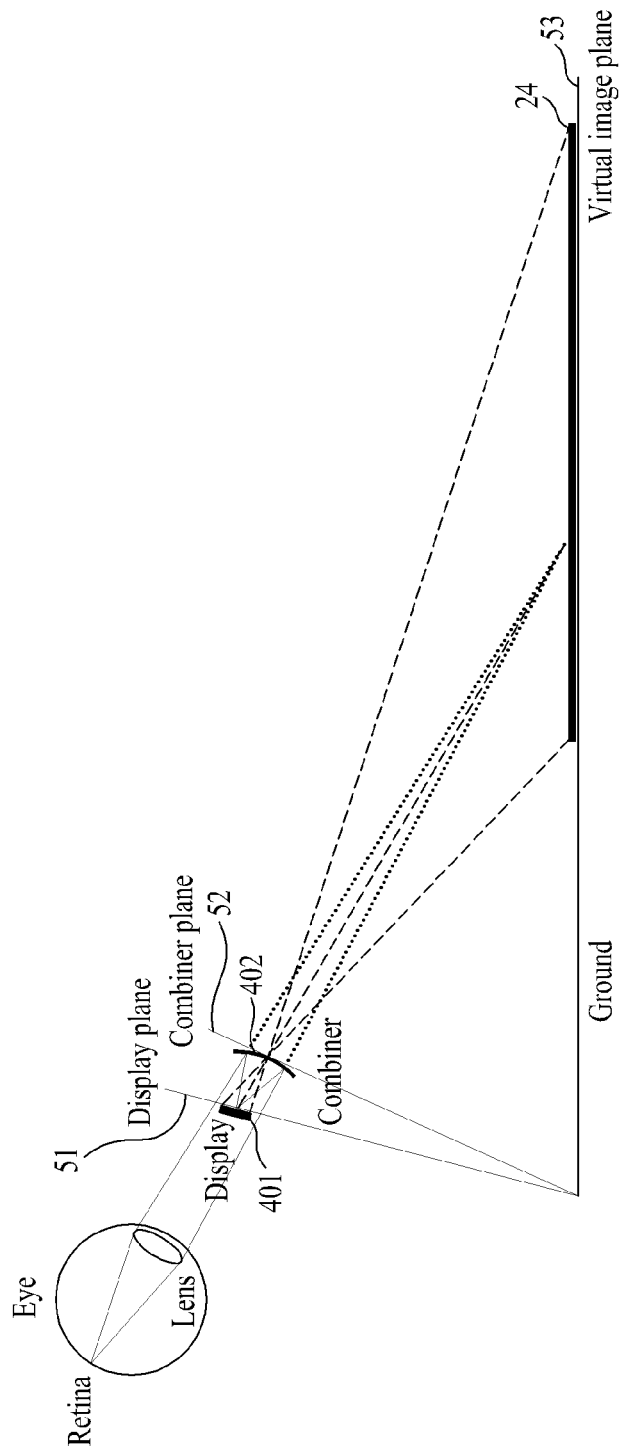
FIG. 5 is a diagram illustrating an imaging condition between a display plane and a combiner plane and a virtual image plane according to an example embodiment.

Referring to FIG. 5, an actual path through which light travels starts from the display device 401 and is reflected by the combiner 402 and, here, the reflected light reaches the eye of the user and is focused on the retina by the lens (solid line). However, an image viewed by the user is the virtual image 24, not an actual image at a location of a display plane 51 at which the actual image is created. Here, the virtual image 24 is located on a virtual plane corresponding to the ground (dotted line). That is, the display plane 51 meets an imaging condition with a virtual image plane 53 through the combiner 402 (dashed line).

A theoretical relational equation between the display device 401 and the combiner 402 to create the virtual image 24 at a location corresponding to the ground may be derived based on an imaging condition between the display plane 51 corresponding to the display device 401 excluding the eye of the user, a combiner plane 52 corresponding to the combiner 402, and the virtual image plane 53 corresponding to the ground.

Figure 6:
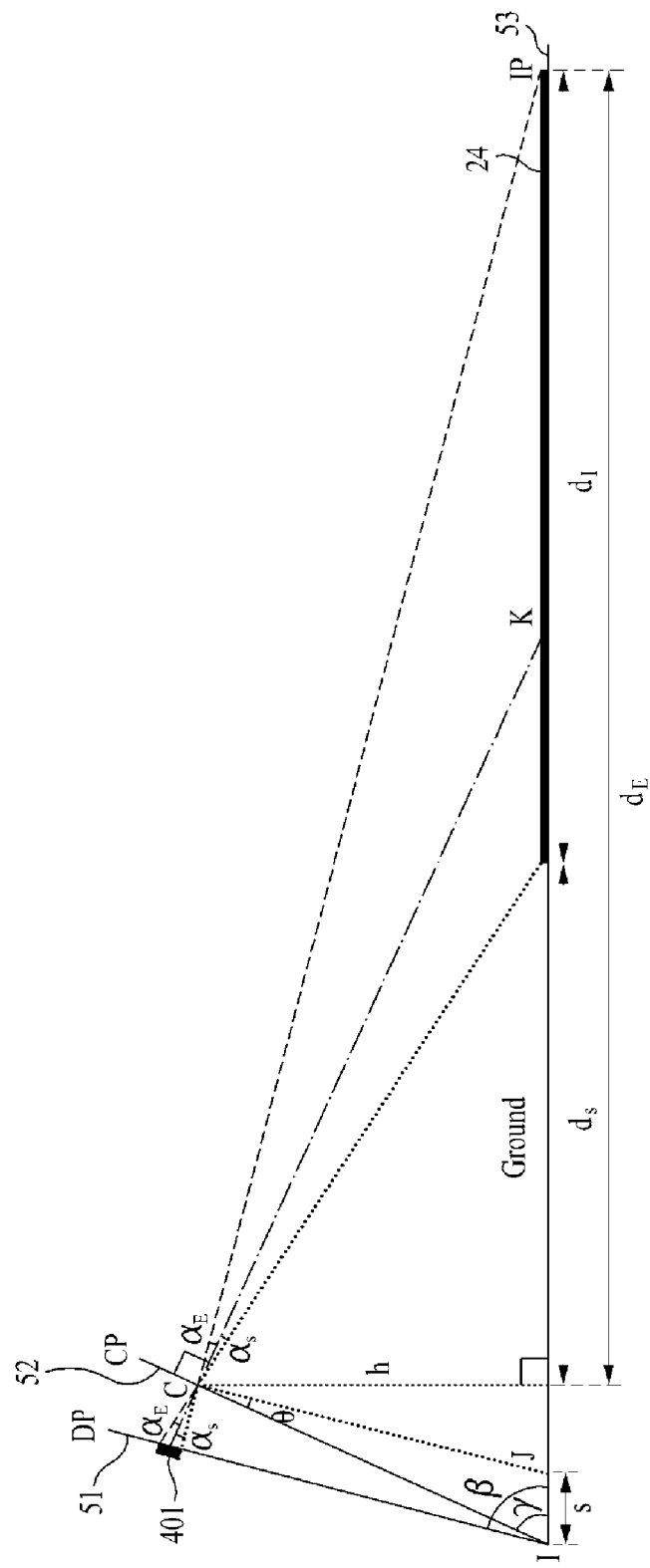
FIG. 6 is a diagram illustrating variables required to derive a relational expression between a display device and a combiner according to an example embodiment.

FIG. 6 illustrates variables required to derive a relational equation between the display device 401 and the combiner 402.

DP represents the display plane 51, CP represents the combiner plane 52, and IP represents the virtual image plane 53. CK represents a straight line that is perpendicular to the CP 52 and passes an optical center C of the combiner 402.

Here, an actual location of the combiner 402 may not necessarily include C and the combiner 402 may be located with an offset according to the location of a user gaze. A relational equation including C is derived for convenience of formulating.

I represents a point at which the DP 51 and the CP 52 and the IP 53 intersect, J represents a point at which a straight line that is parallel to the DP 51 and passes C intersects the IP 53, and K represents a point at which a straight line that is perpendicular to the CP 52 and passes C intersects the IP 53.

$\alpha_E$ and $\alpha_S$ represent an angle of a location that meets an imaging condition on the DP 51 and the IP 53 based on CK. Here, since the corresponding location meets the imaging condition, an orientation angle of the DP 51 and an orientation angle of the IP 53 match at all times.

β represents an angle of the DP 51 based on the IP 53 or the ground, γ represents an angle of the CP 52 based on the IP 53 or the ground, and θ represents an angle between the DP 51 and the CP 52.

h represents a height from the IP 53 or the ground to C, and h' (shown in FIG. 7) represents a value acquired by adding an offset toward an h direction to h (a height at which the combiner 402 is actually used).

s represents a length of IJ, that is, a separation distance between the DP 51 and the CP 52 at the height h in an axial direction parallel to the ground.

s' (shown in FIG. 7) represents a separation distance between the DP 51 and CP 52 at the height h' in the axial direction parallel to the ground.

$d_S$ represents a distance from a location of the center of the combiner 402 based on the IP 53 or the ground to a location at which the virtual image 24 starts.

$d_E$ represents a distance from the location of the center of the combiner 402 based on the IP 53 or the ground to a location at which the virtual image 24 ends.

$d_I$ represents a size of the virtual image 24.

f represents a focal length of the combiner 402.

Initially, a relational equation among β, γ, and θ is expressed as follows.

If an imaging condition between the DP 51 and the IP 53 is applied, the following Equation 1 is established.

$$\sin(\gamma - \theta) = \frac{h}{f}\sin\theta \qquad \text{[Equation 1]}$$

Here, all of γ, θ, h, and f are positive numbers.

In Equation 1, h denotes a height from the ground to a location of the 3D head-up display 400 on a dashboard in the vehicle (accurately, the height to the optical center C of the combiner 402). Also, f denotes the focal length of the combiner 402 of the 3D head-up display 400 having the general size and curvature of the lens that determines the focal length.

If Equation 1 is substituted with h and f, a numerical relation between θ and γ may be derived. Through this, a relational expression β=γ+θ may be derived among β, γ, and θ.

Next, s' may be derived using h', β, γ, and θ through Equation 2.

$$s' = h'\frac{\sin\theta}{\sin\beta\sin\gamma} \qquad \text{[Equation 2]}$$

Also, $d_S$, $d_E$, and $d_I$ may be derived through Equation 3.

$$d_S = h\,\tan(\gamma + \alpha_S)$$

$$d_E = h\,\tan(\gamma + \alpha_E)$$

$$d_I = h(\tan(\gamma + \alpha_E) - \tan(\gamma + \alpha_S)) \qquad \text{[Equation 3]}$$

Here, α denotes a positive number or a negative number based on CK.

Using Equation 3, $d_S$ and $d_I$ may be calculated. Here, if $d_S$ representing the start location of the virtual image 24 and $d_I$ representing the size of the virtual image 24 need to be adjusted, an optical configuration may be optimized by adjusting at least one of h, α, β, and θ.

Through the relational equations, the angles of the DP 51 and the CP 52 relative to the ground and the location and the size of the virtual image 24 may be derived.

Figure 7:
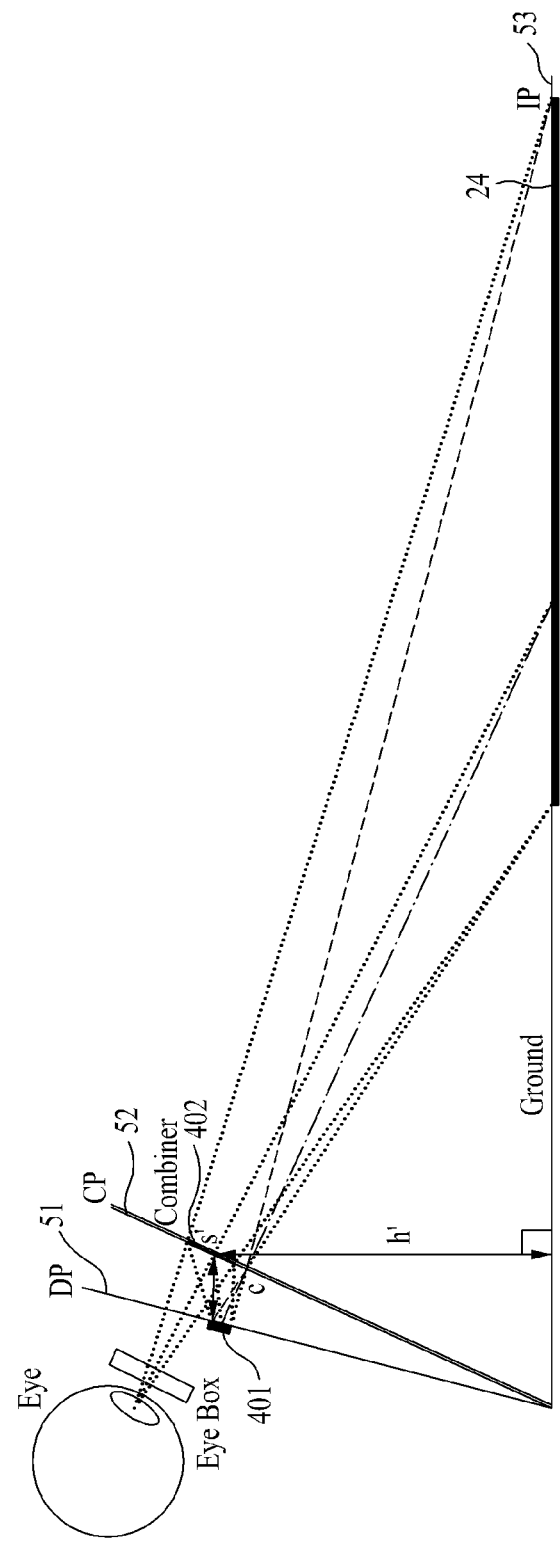
FIG. 7 is a diagram for describing the location of a combiner determined based on an eye-box (a location of a pupil) according to an example embodiment.

Referring to FIG. 7, a required height of an eye-box (a location of pupil) may be generally determined as a height at which an eye is located when a driver sits in the driver's seat. The distance between the eye-box and the combiner 402 is determined from the eye to the combiner 402 of the 3D head-up display 400.

The height h' at the location of the combiner 402 is determined by including an offset based on a location of the eye-box and the location may not necessarily include the optical center C of the combiner 402. The separation distance s' between the DP 51 and the CP 52 may be determined based on h'. Here, s' may be referred to as a distance between the display device 401 and the combiner 402.

Therefore, the 3D head-up display 400 according to an example embodiment may implement the virtual image 24 of the 3D perspective laid to correspond to the ground 25 in front of the driver through the display device 401 and the combiner 402 based on the above relational equations.

If an obstacle overlapping the virtual image 24, such as another vehicle or a person, is present between the driver and the virtual image 24, the driver may feel confused about the sense of distance in a corresponding portion. To solve this issue, the 3D head-up display 400 according to an example embodiment may include a processor configured acquire surrounding information through interaction with a system (not shown) capable of recognizing a surrounding situation, such as an ADAS or various types of sensors included in the vehicle, and to control displaying of the virtual image 24 based on the acquired surrounding information. For example, if the obstacle overlapping the virtual image 24 is present, the 3D head-up display 400 may prevent an image of an area that overlaps the obstacle. As another example, if the obstacle overlapping the virtual image 24 is present, the 3D head-up display 400 may display the virtual image 24 in a direction perpendicular to the ground on the obstacle or at a closer distance than the obstacle (e.g., on the obstacle in front, on the hood of the vehicle, or inside the vehicle, such as a dashboard or a windshield) instead of displaying it on the ground in front. As another example, if the obstacle overlapping the virtual image 24 is present, the 3D head-up display 400 may physically move the virtual image. Here, the 3D head-up display 400 may move the location at which the virtual image 24 is represented by moving at least one of the display device 401 and the combiner 402.

Figure 8:
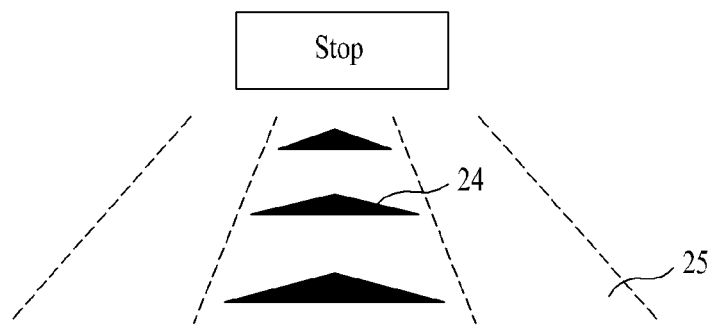
FIG. 8 is a diagram illustrating an image in which a perspective is applied on a virtual plane corresponding to the ground according to an example embodiment.

When creating the virtual image 24 at a location corresponding to the ground 25 in front of the driver, the 3D head-up display 400 according to an example embodiment may create the virtual image 24 having a 3D effect in a direction perpendicular to the ground using a perspective image as illustrated in FIG. 8. Here, the 3D head-up display 400 may apply the perspective of the virtual image 24 within $d_f$ that represents the size of the virtual image 24 based on $d_S$ that represents the start location of the virtual image 24.

Further, the 3D head-up display 400 may simultaneously implement multiple images using multiple display devices.

Figure 9:
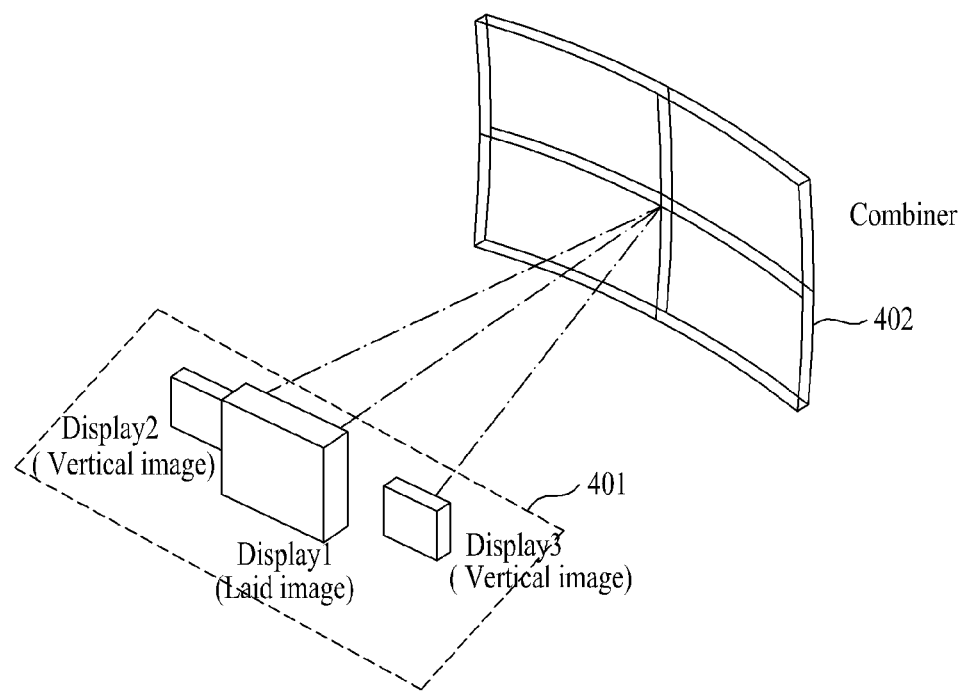
FIG. 9 is a diagram illustrating an optical design configuration of a 3D head-up display for simultaneously implementing multiple images according to an example embodiment.

FIG. 9 illustrates an example of an optical design configuration of the 3D head-up display 400 for simultaneously implementing multiple images according to an example embodiment.

The 3D head-up display 400 may include the display device 401 in which multiple light sources are provided. For example, the 3D head-up display 400 may include a first display configured to create an image laid to correspond to the ground, a second display configured to create an image provided at the side (e.g., left and right and up and down) and perpendicular to the ground based on the first display, and a third display.

The 3D head-up display 400 may simultaneously implement an image laid on the ground and an image perpendicular to the ground through the display device 401 including a plurality of displays. The image laid on the ground may be represented at a far distance of 3 m or more in front of the driver while driving and the image perpendicular to the ground may be represented at a short distance within about 2 to 3 m in front of the user, such as a dashboard or a windshield of the vehicle.

Therefore, a 3D head-up display 400 according to an example embodiment may display visual information required at the point of view of a driver while driving at a location corresponding to the ground in front, and may implement an image at various far distances from the driver by enhancing limitations of the existing head-up display. In particular, the 3D head-up display 400 according to an example embodiment may naturally acquire information without a need to adjust the focus of eyes while driving by providing an image on the ground in front of the driver's main gaze while driving. The 3D head-up display 400 according to an example embodiment may implement an image at the exactly same location as the driving field of view (FOV) and thereby acquire a comfortable FOV without a difference (i.e., a vergence accommodation conflict) between an accommodation and a vergence that causes dizziness and motion sickness in virtual reality (VR) or augmented reality (AR) and may implement the AR optimized for the driver in a vehicle.

The following example embodiments relate to technology for minimizing an error occurring based on a surrounding environment in a 3D head-up display that implements augmented reality at the point of view of a driver by locating an image on the ground.

When locating the virtual image 24 on a background or area corresponding to the ground 25, two types of errors, such as a convergence and a divergence, occur due to mismatch of the sense of distance between the virtual image 24 and the background.

Figure 10:
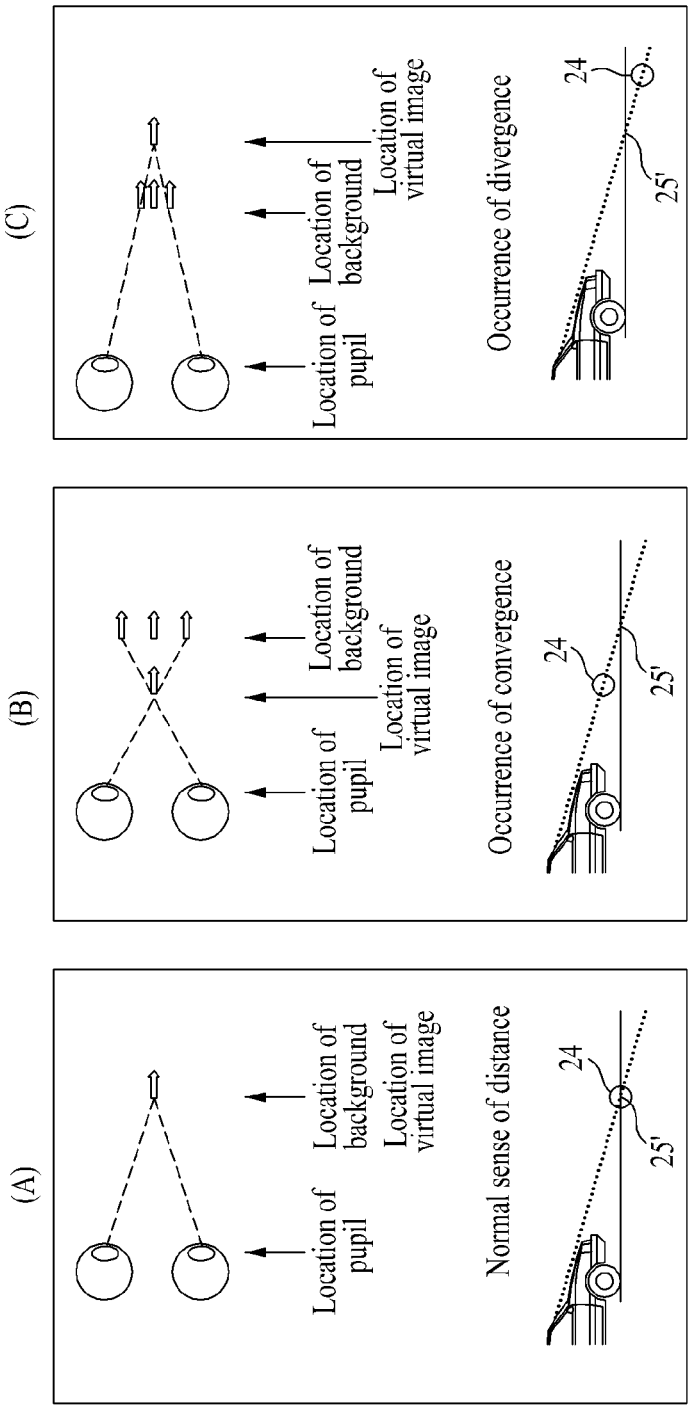
FIG. 10 illustrates diagrams for describing a problem that may occur due to a difference in distance between a virtual image and a background.

Referring to FIG. 10, if the location of the virtual image 24 matches a background 25' corresponding to an actual location (natural view) of a driver's gaze as illustrated in (A) of FIG. 10, a virtual image with normal sense of distance may be generated and a comfortable FOV may be acquired.

In contrast, if the location of the virtual image 24 does not match the background 25' and is located before the background 25' as illustrated in (B) of FIG. 10, an error by convergence occurs. If the location of the virtual image 24 is located after the background 25' as illustrated in (C) of FIG. 10, an error by divergence occurs.

If continuously exposed to the virtual image 24 that includes the error by convergence or divergence for a long time, it may cause fatigue or pain in eyes of the driver and may also cause headaches.

Figure 11:
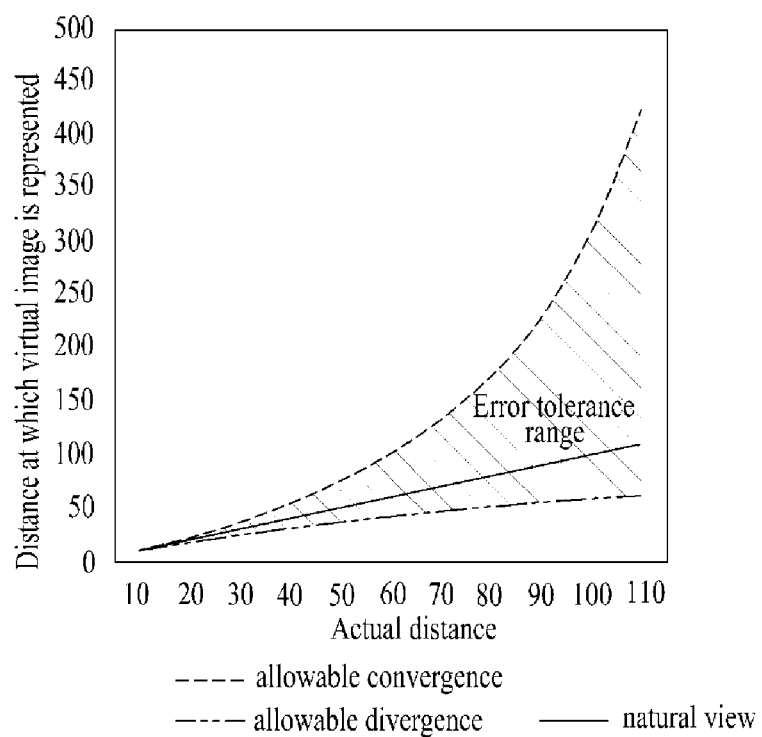
FIG. 11 is a graph illustrating an error tolerance range according to a distance between pupils of a person.
Figure 12:
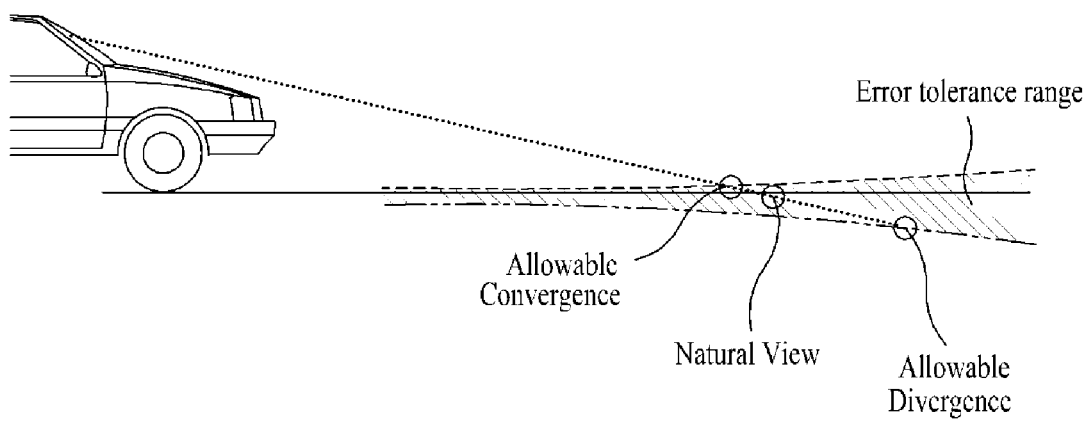
FIG. 12 is a diagram for describing an error tolerance range according to a distance in an actual driving environment.

Referring to FIG. 11, an error tolerance range about a representation distance of a virtual image according to an actual distance from an observer to a background is present. Referring to FIG. 12, if the virtual image 24 is present within allowable convergence range and allowable divergence range, the driver does not feel the difference in the sense of distance between an actual location and the virtual image 24.

Figure 13:
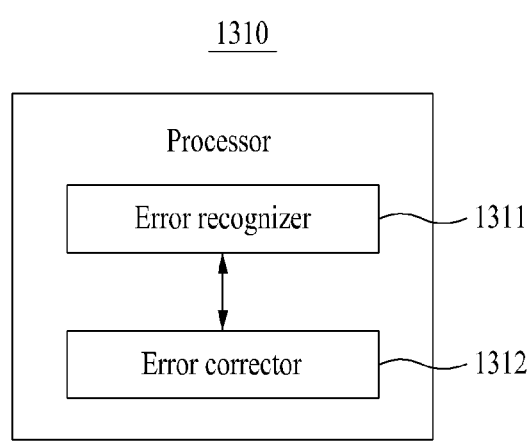
FIG. 13 is a block diagram of a processor of a 3D head-up display according to an example embodiment.

Therefore, a corresponding error may be corrected to maintain a difference in distance between the virtual image 24 and the background 25' within the error tolerance range. Referring to FIG. 13, the 3D head-up display 400 according to an example embodiment may include a processor 1310 configured to correct a difference in distance between an actual location corresponding to a driver's gaze and the virtual image 24 based on surrounding information.

Figure 14:
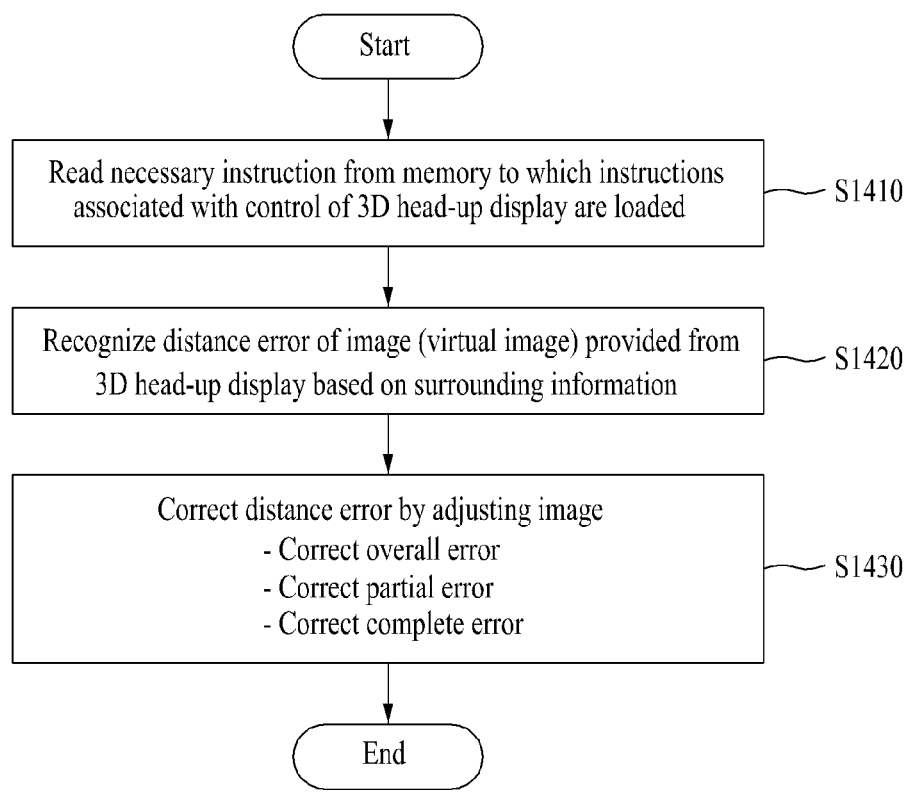
FIG. 14 is a flowchart illustrating an error correction method performed by a 3D head-up display according to an example embodiment.

Referring to FIG. 13, the processor 1310 may include an error recognizer 1311 and an error corrector 1312 as components to perform an error correction method of FIG. 14. Depending on example embodiments, the components of the processor 1310 may be selectively included in or excluded from the processor 1310. Also, depending on example embodiments, the components of the processor 1310 may be separated or merged for representation of functions of the processor 1310.

The processor 1310 and the components of the processor 1310 may control the 3D head-up display 400 to perform operations S1410 to S1430 included in the error correction method of FIG. 14. For example, the processor 1310 and the components of the processor 1310 may be configured to execute an instruction according to a code of at least one program and a code of an OS included in the 3D head-up display 400.

Here, the components of the processor 1310 may be representations of different functions of the processor 1310 performed by the processor 1310 in response to an instruction provided from a program code stored in the 3D head-up display 400. For example, the error recognizer 1311 may be used as a functional representation of the processor 1310 that controls the 3D head-up display 400 to recognize a distance error between a virtual image and a background.

In operation S1410, the processor 1310 may read a necessary instruction from a memory included in the 3D head-up display 400 to which instructions associated with control of the 3D head-up display 400 are loaded. In this case, the read instruction may include an instruction to control the processor 1310 to perform the following operations S1420 and S1430.

In operation S1420, the error recognizer 1311 may recognize an error according to a difference in distance between an actual location of a driver's gaze and a virtual image based on surrounding information. The error recognizer 1311 may acquire 3D information on an area on which an image (that is, a virtual image) is to be located as the surrounding information using data acquired through a self-sensor system included in the 3D head-up display 400 and/or an ADAS or various types of sensor systems in a vehicle interactable with the 3D head-up display 400. To acquire 3D information, data acquired by the vehicle through the ADAS or various types of sensors may be used. Further, to display an image at an accurate location, a stereo camera, an infrared (IR) camera, a LiDAR, a RADAR, and an ultrasound sensor may be additionally used. For example, in the case of using a sensor for measuring a distance value according to a location, such as a LIDAR and a RADAR, to acquire 3D information, a 3D point cloud may be created by measuring an area in front, such as a road surface, a structure and a surrounding vehicle, and a surface corresponding to mesh data, that is, 3D information may be acquired based on the 3D point cloud. As another example, in the case of using a stereo camera to acquire 3D information, the 3D information may be acquired by recognizing images at two different angles for an area in front as a binocular parallax and by accumulating the sense of distance caused by a difference between the two images. Here, the error recognizer 1311 may recognize a distance error of an image provided from the 3D head-up display 400 based on the 3D information on the area in front. As a method of acquiring the 3D information, various known technologies in addition to the above method may be applied. The error recognizer 1311 may classify an error occurrence pattern into three patterns based on the 3D information on the area in front and may recognize the classified error occurrence pattern: (1) if an error occurs in an overall area in front due to a driving road surface environment (overall error), (2) if an error occurs in a partial area of an area in front due to a sharp curve of a road in front and an obstacle on the road (e.g., a surrounding vehicle, a person, and irregularities) (partial error), and (3) if an image that matches the ground is not providable in response to a distance from an obstacle in front or a surrounding vehicle being close within a threshold due to vehicle congestion or parking (complete error).

In operation S1430, the error corrector 1312 may adjust an image provided from the 3D head-up display 400 and may correct a distance error of the corresponding image to maintain the difference in distance between the image and the background within the error tolerance range. The error corrector 1312 may correct the distance error using a scheme suitable for a corresponding pattern into consideration of the error occurrence pattern (overall error, partial error, complete error).

Hereinafter, the error correction method is further described.

Figure 15:
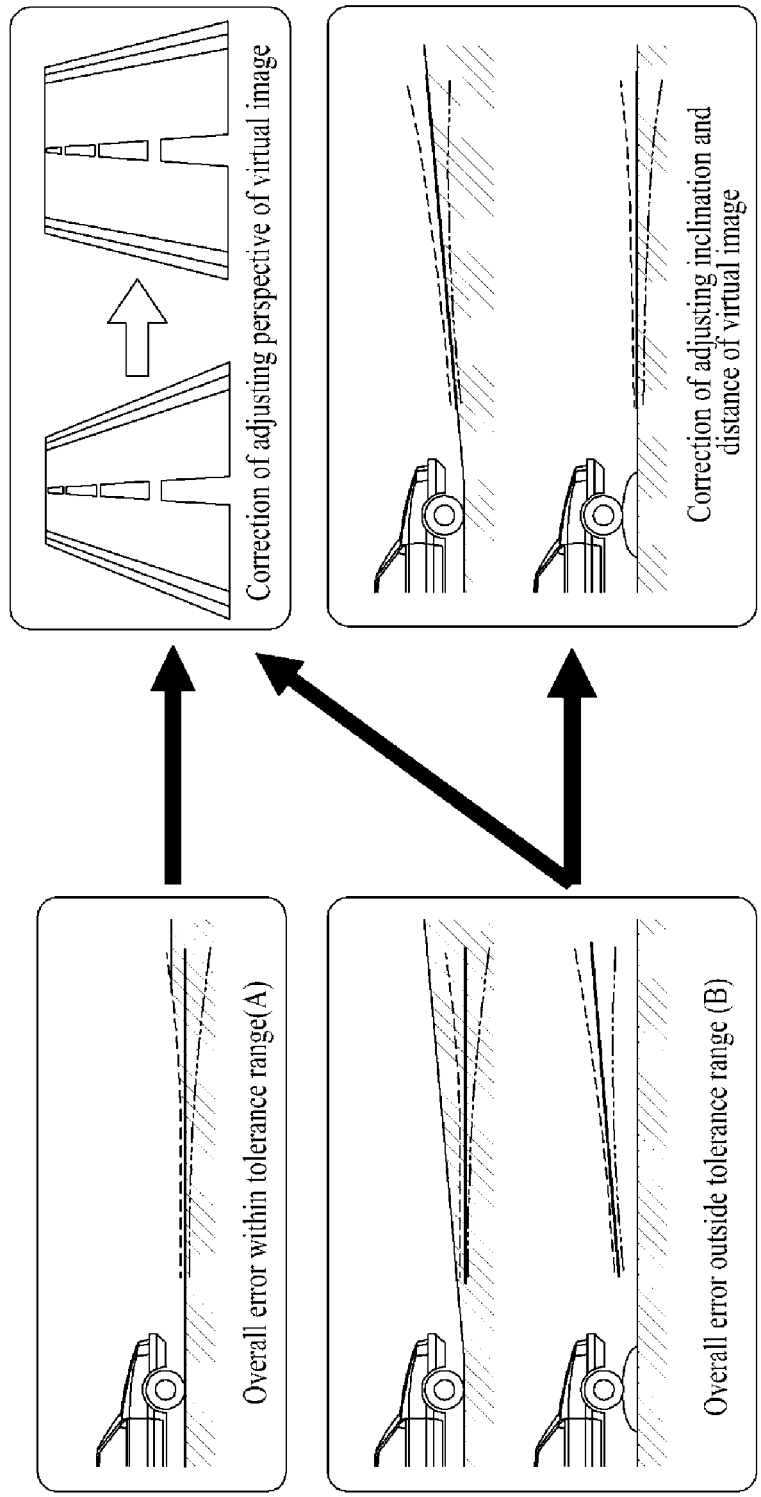
FIGS. 15 and 16 illustrate diagrams for describing a scheme of correcting an overall error according to an example embodiment.
Figure 16:
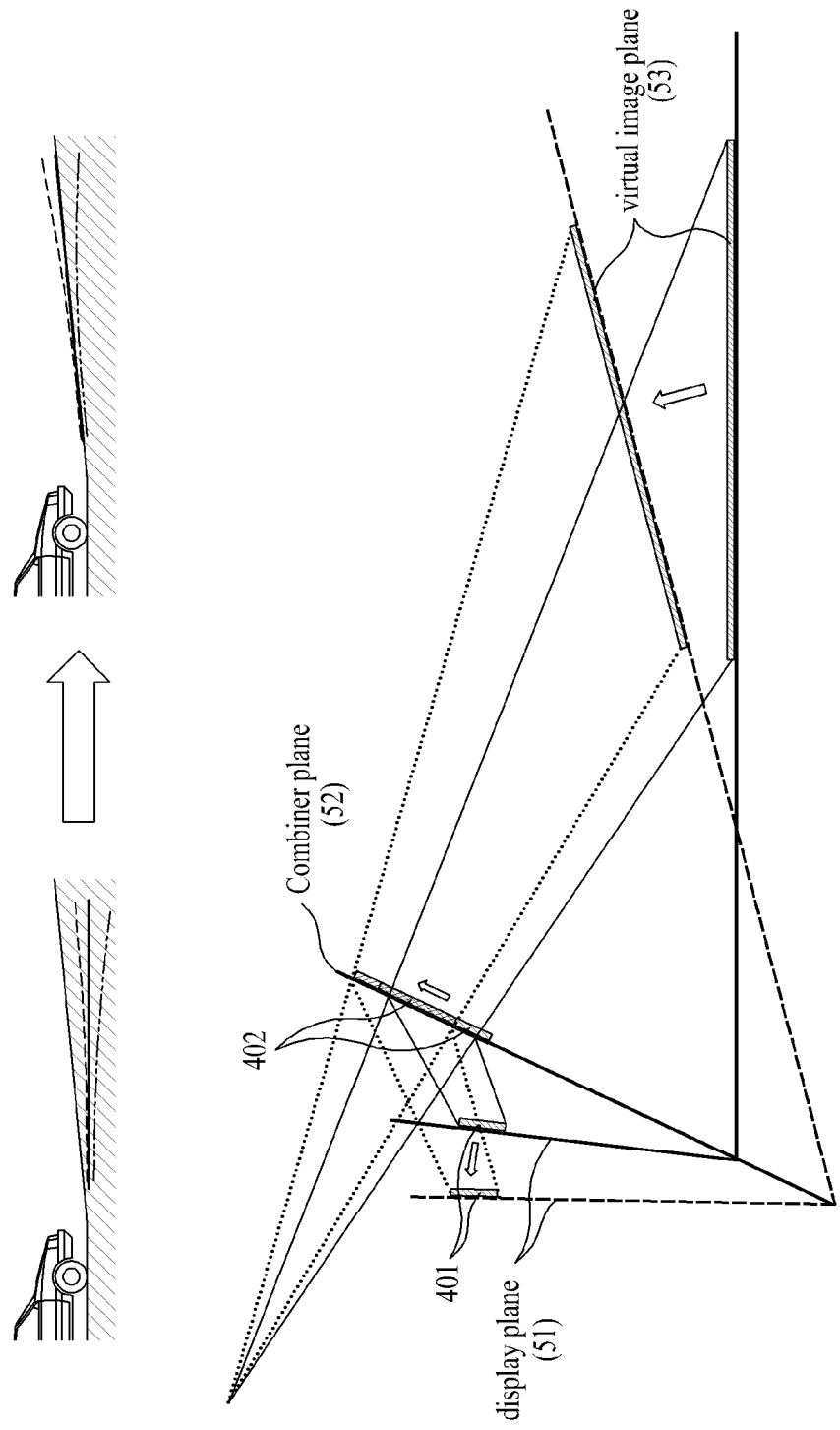

FIGS. 15 and 16 illustrate examples of describing a scheme of correcting an overall error according to an example embodiment.

FIG. 15 illustrates examples of a situation in which an overall error occurs due to a driving road surface environment, such as uphill, downhill, and the roughness of the road surface.

If the overall error occurs within the tolerance range (A), the error corrector 1312 may maintain a virtual image without performing a separate error correction process or may perform a correction of adjusting the perspective of the virtual image. Here, the error corrector 1312 may adjust the perspective of the virtual image within $d_I$ that represents the size of the virtual image based on $d_S$ that represents the start location of the virtual image.

If the overall error occurs outside the tolerance range (B), the error corrector 1312 may simultaneously perform a correction of adjusting the perspective of the virtual image and a correction of adjusting at least one of an inclination and a distance of the virtual image. For example, the error corrector 1312 may correct the location of the virtual image by adjusting the location and the inclination of the display device 401. The 3D head-up display 400 may include an at least two-axis actuator as a component for adjusting the location and the inclination of at least one of the display device 401 and the combiner 402. Referring to FIG. 16, the error corrector 1312 may adjust the location and/or the inclination of at least one of the display device 401 and the combiner 402 using the actuator. Here, the error corrector 1312 may adjust the location and the inclination of the display device 401 within the range that meets an imaging condition between the display plane 51 and the virtual image plane 53. If an additional component, such as a mirror, is included in an optical system, the effect, such as directly adjusting the display device 401, may be acquired by adjusting the corresponding component. If the location of the virtual image is deviated from the FOV of the combiner 402 in response to adjusting the display device 401, the error corrector 1312 may move the location of the combiner 402 on the combiner plane 52.

Therefore, if the overall error occurs outside the tolerance range, the error corrector 1312 may correct the distance error of the virtual image based on the driving road surface environment in front by adjusting the inclination and the distance of the virtual image.

Figure 17:
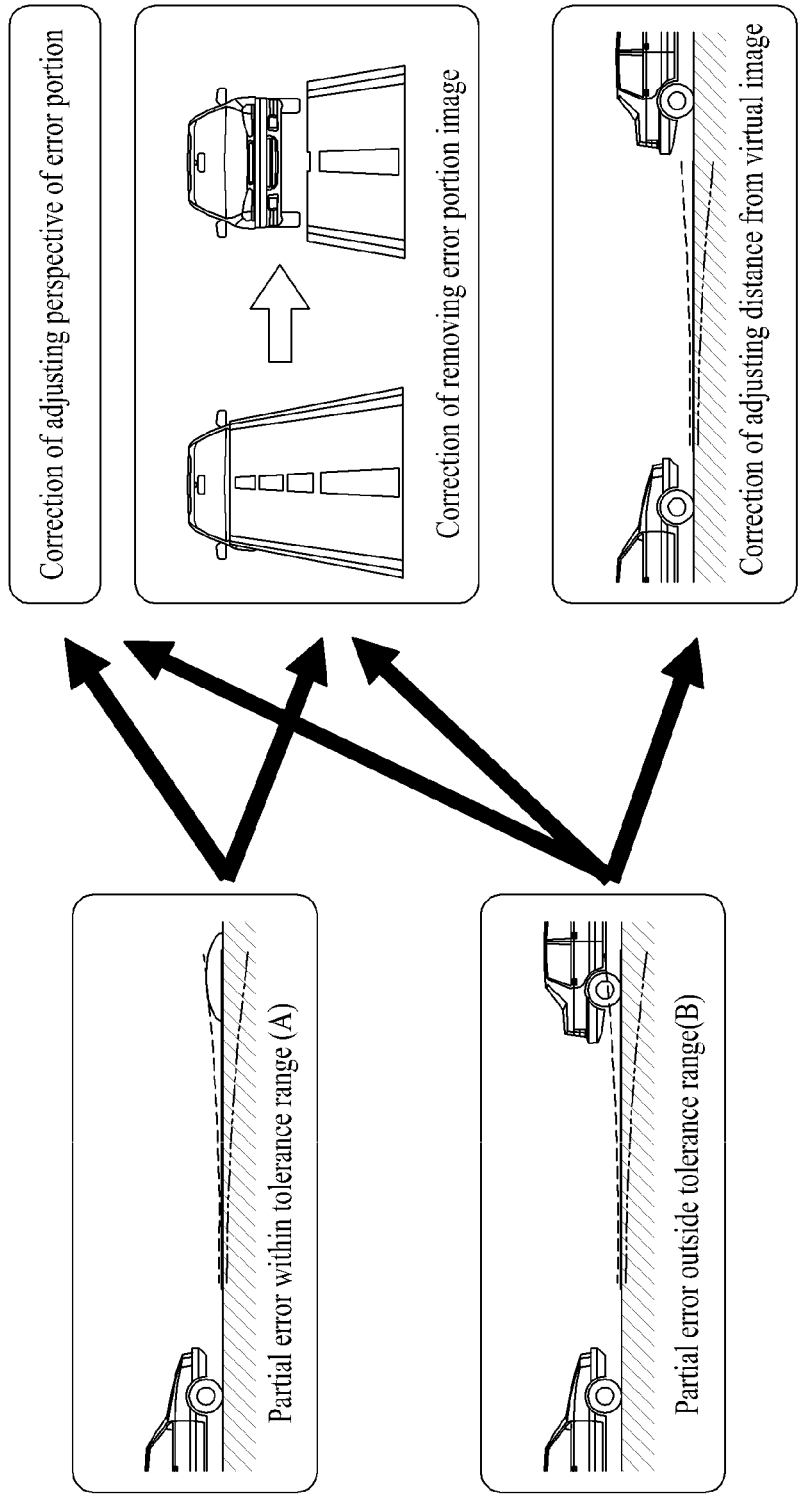
FIGS. 17 and 18 illustrate diagrams for describing a scheme of correcting a partial error according to an example embodiment.
Figure 18:
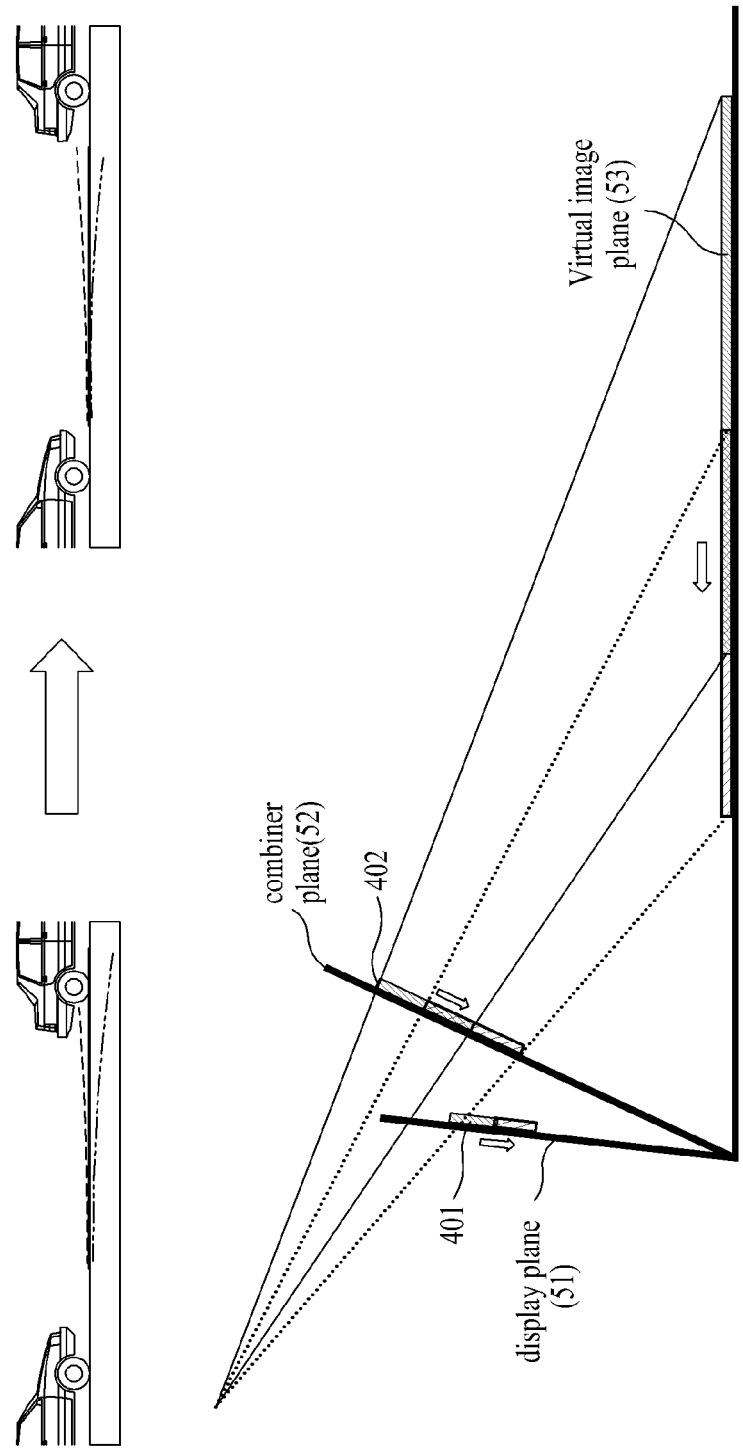

FIGS. 17 and 18 illustrate examples of describing a scheme of correcting a partial error according to an example embodiment.

FIG. 17 illustrates an example of a situation in which the partial error occurs due to an obstacle on the road, such as a sharp curve on the road in front or a surrounding vehicle, a person, and the roughness of the road surface.

If the partial error occurs within the tolerance range (A), the error corrector 1312 may maintain a virtual image without performing a separate error correction process or may perform a correction of adjusting the perspective of a portion in which an error occurs. Here, the error corrector 1312 may adjust the perspective of an error occurrence portion within $d_I$ that represents the size of the virtual image based on a start location at which the error of the virtual image occurs. As another example, the error corrector 1312 may perform a correction in a manner of removing (preventing) an image of an error occurrence portion in the virtual image.

If the partial error occurs outside the tolerance range (B), the error corrector 1312 may perform a correction of adjusting the perspective of an error occurrence portion or removing an image of the corresponding portion in the virtual image. In particular, the error corrector 1312 may perform a correction of adjusting a distance (i.e., a location) at which the virtual image is provided. For example, to adjust a distance from the virtual image, the error corrector 1312 may adjust the location of the display device 401 on the display plane 51 and, if necessary, may adjust the location of the combiner 402 on the combiner plane 52. To adjust the distance from the virtual image, the error corrector 1312 may change the angles and the locations of the display device 401 and the combiner 402. The 3D head-up display 400 may include an at least one-axis actuator as a component for adjusting the location of at least one of the display device 401 and the combiner 402. Referring to FIG. 18, the error corrector 1312 may adjust the location of the display device 401 using the actuator. If an additional component, such as a mirror, is included in an optical system, the effect, such as directly adjusting the display device 401, may be acquired by adjusting the corresponding component. If the location of the virtual image is deviated from the FOV of the combiner 402 in response to adjusting the location of the display device 401, the error corrector 1312 may additionally move the location of the combiner 402 on the combiner plane 52. In addition to the method of adjusting the distance from the virtual image, a method of adjusting the size of the virtual image (i.e., $d_f$) may be applied for the error correction.

Therefore, if the partial error occurs outside the tolerance range, the error corrector 1312 may provide the virtual image at a location deviated from the error occurrence portion by adjusting the distance at which the virtual image is provided.

Figure 19:
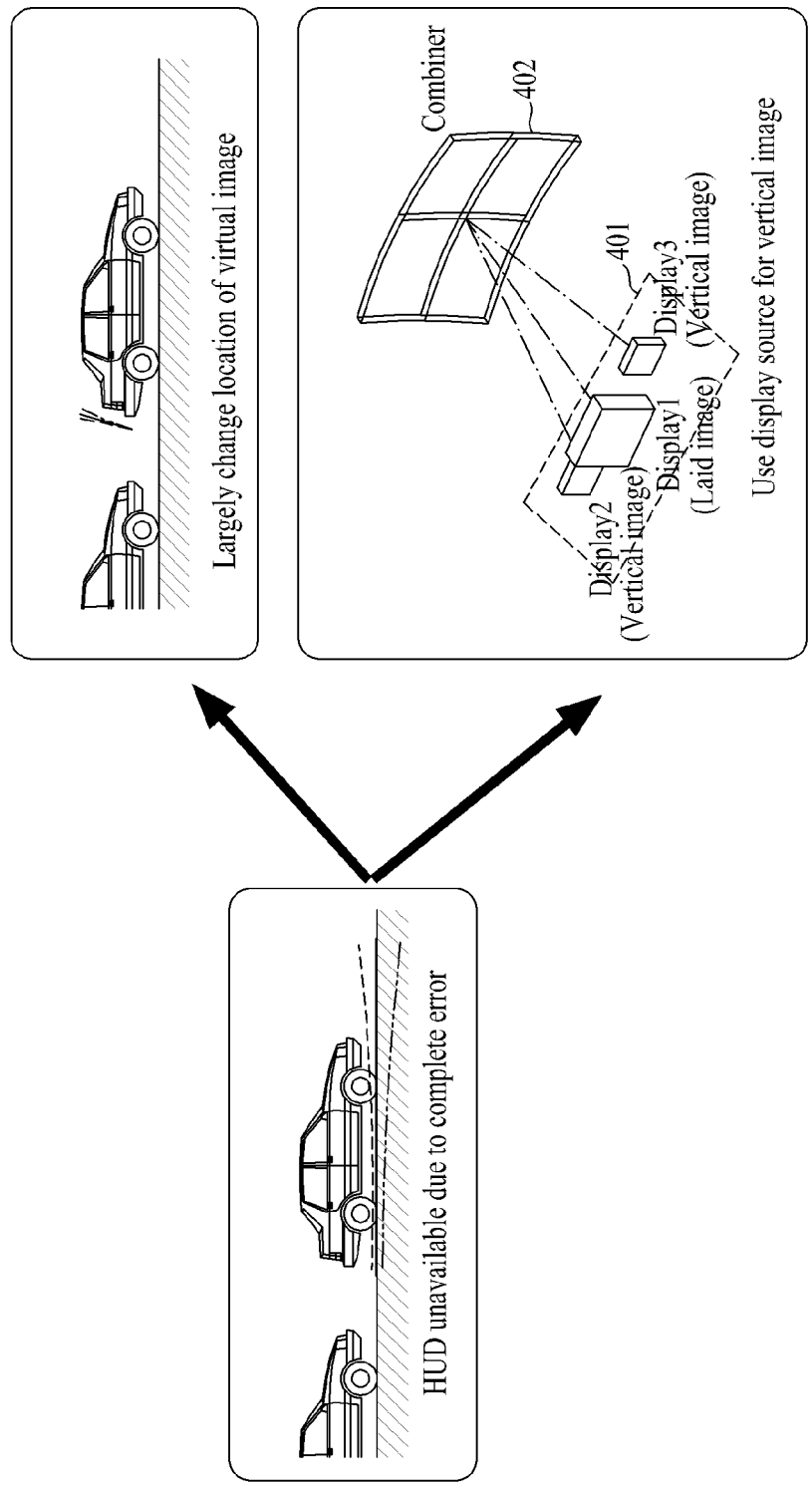
FIG. 19 illustrates a diagram for describing a scheme of correcting a complete error according to an example embodiment.

FIG. 19 illustrates an example of describing a scheme of correcting a complete error according to an example embodiment.

FIG. 19 illustrates an example of a situation in which the complete error occurs due to a vehicle congestion.

If a complete error unrepresentable in a form that allows a virtual image to correspond to the ground occurs, the error corrector 1312 may change the location of the virtual image. For example, the error corrector 1312 may display the virtual image in a direction perpendicular to the ground on an obstacle or at a closer distance than the obstacle (e.g., on the obstacle in front, on the hood of a vehicle, or inside the vehicle, such as a dashboard or a windshield) instead of displaying it on the ground in front.

As another example, in a situation in which the complete error occurs, the error corrector 1312 may use a display capable of displaying the virtual image at a different location while using the same combiner 402, separate from a display of matching the virtual image to the ground. As illustrated, if the display device 401 includes a first display configured to create an image laid to correspond to the ground, a second display configured to create the image perpendicular to the ground, and a third display in a form in which multiple light sources are provided, the error corrector 1312 may turn OFF the first display and may display the virtual image using at least one of the second display and the third display based on the complete error.

Therefore, in a situation in which it is completely impossible to use a display of matching the virtual image to the ground, an image perpendicular to the ground may be provided by moving the location of the virtual image from the ground to a closer location to a driver or using another display.

The error correction method may include a method of adjusting the perspective of a virtual image, a method of adjusting the inclination or the location of the virtual image, a method of removing an error portion in the virtual image, a method of converting to a vertical image, and a method of using a separate display, and may apply a single correction method or at least two correction methods based on an error size or an error pattern.

As described above, according to an example embodiment, it is possible to provide a 3D head-up display of displaying visual information, required at the point of view of a driver while driving, at a location corresponding to the ground in front. The 3D head-up display according to an example embodiment may implement an image at various far distances from the driver by enhancing limitations of the existing head-up display that fixedly displays an image within a desired distance from the driver in the vehicle.

In particular, the 3D head-up display according to an example embodiment may naturally acquire information without a need to adjust the focus of eyes while driving by providing an image on the ground in front of the driver's main gaze while driving. The 3D head-up display according to an example embodiment may implement an image at the exactly same location as a driving FOV and thereby acquire a comfortable FOV without a difference (i.e., a vergence accommodation conflict) between an accommodation and a vergence that causes dizziness and motion sickness in VR or AR and may implement the AR optimized for the driver in the vehicle.

Also, according to example embodiments, it is possible to minimize an error occurring based on a surrounding environment in a 3D head-up display that implements augmented reality at the point of view of a driver by locating an image on the ground. Also, according to example embodiments, it is possible to effectively correct an error occurring since the sense of distance of an image provided by a 3D head-up display differs from a surrounding environment, based on an error occurrence pattern.

The apparatuses described herein may be implemented using hardware components, software components, or a combination thereof. For example, the apparatuses and the components described herein may be implemented using one or more general-purpose or special purpose computers, such as, for example, a processing device including processor, a controller, an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will be appreciated that a processing device may include multiple processing elements and/or multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and/or data may be embodied in any type of machine, component, physical equipment, computer storage medium or device, to be interpreted by the processing device or to provide an instruction or data to the processing device. The software also may be distributed over network coupled computer systems so that the software is stored and executed in a distributed fashion. The software and data may be stored by one or more computer readable storage media.

The methods according to the above-described example embodiments may be configured in a form of program instructions performed through various computer devices and recorded in non-transitory computer-readable media. Here, the media may continuously store computer-executable programs or may transitorily store the same for execution or download. Also, the media may be various types of recording devices or storage devices in a form in which one or a plurality of hardware components are combined. Without being limited to media directly connected to a computer system, the media may be distributed over the network. Examples of the media include magnetic media such as hard disks, floppy disks, and magnetic tapes; optical media such as CD-ROM and DVDs; magneto-optical media such as floptical disks; and hardware devices that are specially configured to store program instructions, such as read-only memory (ROM), random access memory (RAM), flash memory, and the like. Examples of other media may include record media and storage media managed by an app store that distributes applications or a site that supplies and distributes other various types of software, a server, and the like.

Although the example embodiments are described with reference to some specific example embodiments and accompanying drawings, it will be apparent to one of ordinary skill in the art that various alterations and modifications in form and details may be made in these example embodiments without departing from the spirit and scope of the claims and their equivalents. For example, suitable results may be achieved if the described techniques are performed in different order, and/or if components in a described system, architecture, device, or circuit are combined in a different manner, and/or replaced or supplemented by other components or their equivalents. Therefore, other implementations, other example embodiments, and equivalents of the claims are to be construed as being included in the claims.

What is claimed is:

1. A vehicular three-dimensional (3D) head-up display comprising:
a display device configured to function as a light source; and
a combiner configured to simultaneously reflect light from the light source toward a driver's seat and to transmit light from outside of a vehicle,
wherein an image created by the light from the light source is displayed as a virtual image of a 3D perspective laid to correspond to the ground in front of the vehicle,
wherein the virtual image is created based on an imaging condition between a display plane corresponding to the display device and a combiner plane corresponding to the combiner and a virtual image plane corresponding to the ground, and
wherein a start location and a size of the virtual image are determined using an angle that meets the imaging condition on the display plane and the virtual image plane based on a straight line that is perpendicular to the combiner plane and passes an optical center of the combiner.

2. The vehicular 3D head-up display of claim 1, wherein the start location and the size of the virtual image are adjusted based on at least one of an angle of the display plane based on the virtual image plane, an angle between the display plane and the combiner plane, and a height from the virtual image plane to the optical center of the combiner.

3. The vehicular 3D head-up display of claim 1, wherein a separation distance between the display device and the combiner at a height from the virtual image plane to the combiner is derived based on a height value acquired by adding an offset toward a corresponding height direction to a height from the virtual image plane to the optical center of the combiner, an angle of the display plane based on the virtual image plane, an angle of the combiner plane based on the virtual image plane, and an angle between the display plane and the combiner plane.

4. The vehicular 3D head-up display of claim 1, wherein a location of the combiner is determined based on a height that comprises an offset according to a location of a required eye-box.

5. The vehicular 3D head-up display of claim 1, further comprising:
a processor configured to display the virtual image as the 3D perspective image.

6. The vehicular 3D head-up display of claim 1, wherein the display device is configured in a form in which multiple light sources are arranged to simultaneously implement multiple images.

7. The vehicular 3D head-up display of claim 6, wherein the display device comprises:
a first display configured to create an image laid to correspond to the ground; and
at least one second display configured to create an image perpendicular to the ground.

8. The vehicular 3D head-up display of claim 1, further comprising:
a processor configured to recognize and correct a distance error between a background corresponding to the ground and the virtual image based on surrounding information on an area in front of the vehicle.

9. The vehicular 3D head-up display of claim 8, wherein the processor is configured to distinguishably recognize an overall error that the distance error occurs in an overall area in front, a partial error that the distance error occurs in a partial area in front, and a complete error of a situation in which a distance from an object in front is close within a threshold, based on the surrounding information.

10. The vehicular 3D head-up display of claim 8, wherein the processor is configured to acquire the surrounding information from a sensor comprised in the vehicular 3D head-up display or an advanced driver-assistance system (ADAS) or a sensor comprised in the vehicle.

11. The vehicular 3D head-up display of claim 8, wherein the processor is configured to adjust the virtual image to maintain the distance error within a preset error tolerance range.

12. The vehicular 3D head-up display of claim 8, wherein the processor is configured to perform a correction of adjusting the 3D perspective of the virtual image.

13. The vehicular 3D head-up display of claim 8, wherein the processor is configured to adjust an inclination or a location of the virtual image by adjusting at least one of the light source and the combiner.

14. The vehicular 3D head-up display of claim 13, wherein the processor is configured to move a location of the combiner if the location of the virtual image is outside a field of view (FOV) of the combiner.

15. The vehicular 3D head-up display of claim 8, wherein the processor is configured to adjust a perspective of a portion in which an error occurs or to remove a partial image thereof if the distance error occurs in a partial area in front.

16. The vehicular 3D head-up display of claim 8, wherein, if the distance error occurs due to an obstacle in front, the processor is configured to display an image that is perpendicular to the ground on the obstacle or at a closer distance than the obstacle instead of displaying the image on the ground.

17. The vehicular 3D head-up display of claim 8, wherein the display device comprises:
- a first display configured to create an image laid to correspond to the ground; and
- at least one second display configured to create an image perpendicular to the ground,
- wherein the processor is configured to display the virtual image using the second display instead of using the first display when the distance error occurs due to an obstacle in front.

* * * * *